Patented Jan. 15, 1952

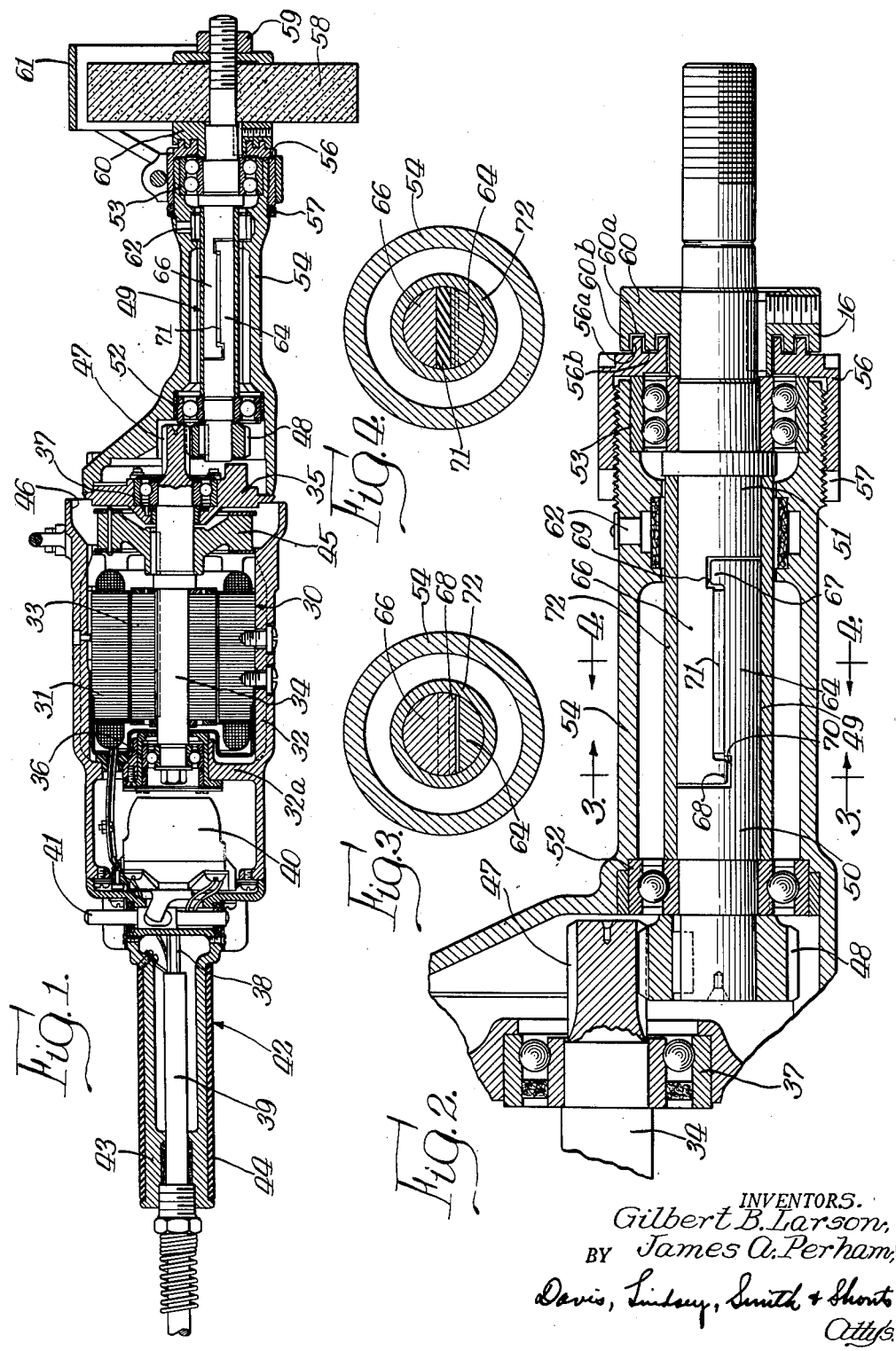

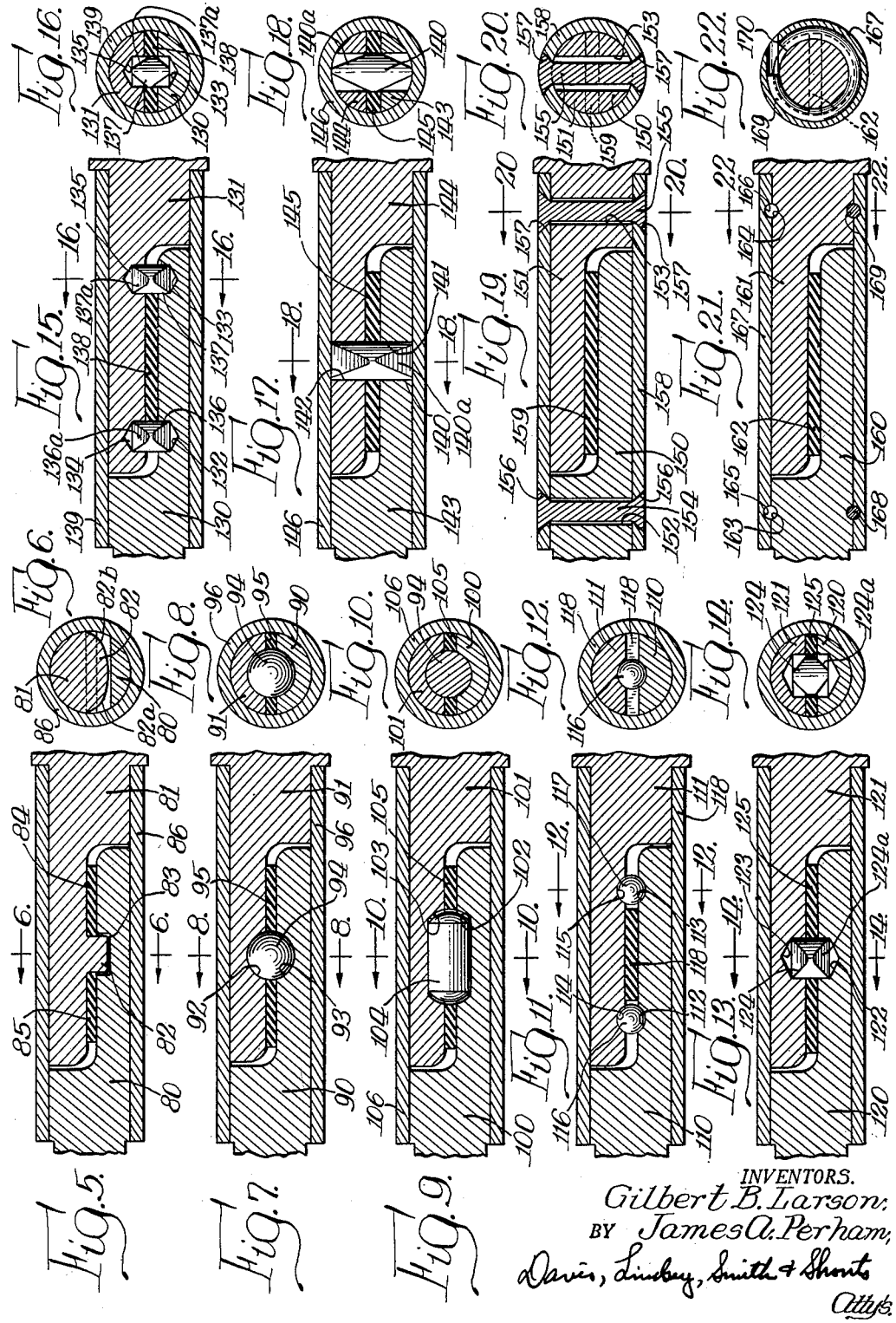

2,582,873

UNITED STATES PATENT OFFICE 2,582,873

FLEXIBLE SPINDLE FOR ROTARY POWER TOOLS

Gilbert B. Larson, Geneva, and James A. Perham, Aurora, Ill., assignors to Independent Pneumatic Tool Company, Chicago, Ill., a corporation of Delaware Application April 28, 1947, Serial No. 744,394

10 Claims. (Cl. 64—27)

This invention relates to portable rotary power tools and more particularly to a flexible driving shaft or spindle for tools of that general character, such as rotary grinders, whereby the vibrations occurring during operation of the tools may be eliminated, deadened or absorbed so as to prevent damage to the gears, bearings, wires and other parts thereof.

It is well recognized that the vibrations which occur in portable rotary power tools of the type having a motor for driving a spindle or shaft at a high rate of speed cause injury to the gears, bearings and other parts thereof. These vibrations tend to be somewhat more severe in rotary grinders and the results injury causes frequent breakdown of the tools, thereby increasing their operating costs and shortening their operable life. Some attempts have been made to eliminate such vibrations by one means or another but such attempts on the whole have not been entirely successful or commercially satisfactory. Some of these structures failed to sufficiently reduce the vibrations to a satisfactory minimum while others, although approximating their intended purpose, possessed inherent structural deficiencies which rendered them also commercially unacceptable.

It is, therefore, one of the objects of the present invention to provide a flexible drive means for rotary tools, such as grinders, by means of which the vibrations occurring during application of the tools to the work may be deadened or absorbed so as to prevent damage to various parts thereof.

Another object of the present invention is to provide a flexible driving shaft or spindle for portable motor driven rotary tools, such as grinders, adapted to deaden or absorb operational vibrations for the prevention of damage and undue wear to gears, bearings and other parts thereof.

A further object of the present invention is to provide a flexible, multipart driving shaft or spindle for rotary power tools, such as grinders, adapted to deaden or absorb operational vibrations, the component parts of the shaft being maintained in proper axial relationship upon relative rotation therebetween, and axial pressure of the shaft against the bearings, gears and other parts being thereby eliminated.

Other objects and advantages of the present invention will become apparent as this description progresses, reference being had to the accompanying drawings, in which:

Figure 1 is a longitudinal sectional view with some parts in elevation, illustrating a portable electrically driven grinder embodying one form of flexible shaft or spindle comprising my invention;

Fig. 2 is an enlarged longitudinal sectional view of the flexible shaft portion of the tool and related parts embodying the present invention;

Fig. 3 is a transverse sectional view taken on the line 3—3 of Fig. 2 looking in the direction of the arrows;

Fig. 4 is a transverse sectional view taken on the line 4—4 of Fig. 2 looking in the direction of the arrows;

Fig. 5 is a longitudinal sectional view of a second form of flexible shaft comprising the present invention;

Fig. 6 is a transverse sectional view of the second form of flexible shaft taken on the line 6—6 of Fig. 5 looking in the direction of the arrows;

Fig. 7 is a longitudinal sectional view of a third form of flexible shaft comprising the present invention;

Fig. 8 is a transverse sectional view of the third form of flexible shaft taken on the line 8—8 of Fig. 7 looking in the direction of the arrows;

Fig. 9 is a longitudinal sectional of the fourth form of flexible shaft comprising the present invention;

Fig. 10 is a transverse sectional view of the fourth form of flexible shaft taken on the line 10—10 of Fig. 9 looking in the direction of the arrows;

Fig. 11 is a longitudinal sectional view of a fifth form of flexible shaft comprising the present invention;

Fig. 12 is a transverse sectional view of the fifth form of flexible shaft taken on the line 12—12 of Fig. 11 looking in the direction of the arrows;

Fig. 13 is a longitudinal sectional view of a sixth form of flexible shaft comprising the present invention;

Fig. 14 is a transverse sectional view of the sixth form of flexible shaft taken on the line 14—14 of Fig. 13 looking in the direction of the arrows;

Fig. 15 is a longitudinal sectional view of a seventh form of flexible shaft comprising the present invention;

Fig. 16 is a transverse sectional view of the seventh form of flexible shaft taken on the line 16—16 of Fig. 15 and looking in the direction of the arrows;

Fig. 17 is a longitudinal sectional view of an eighth form of flexible shaft comprising the present invention.

Fig. 18 is a transverse sectional view of the eighth form of flexible shaft taken on the line 18—18 of Fig. 17 looking in the direction of the arrows;

Fig. 19 is a longitudinal sectional view of a ninth form of flexible shaft comprising the present invention;

Fig. 20 is a transverse sectional view of the ninth form of flexible shaft taken on the line 20—20 in Fig. 19 looking in the direction of the arrows;

Fig. 21 is a longitudinal sectional view of a tenth form of flexible shaft comprising the present invention; and Fig. 22 is a transverse sectional view of the tenth form of flexible shaft taken on the line 22—22 of Fig. 21 looking in the direction of the arrows.

Referring now more particularly to Figs. 1 to 4, inclusive, of the drawings, one preferred embodiment of flexible driving shaft or spindle comprising the present invention is illustrated therein applied to a portable, electrically driven, rotary grinder of conventional type, although it is to be understood that the present invention may be applied to other rotary power tools driven by other power means, such as a pneumatic motor, for the accomplishment of similar objects. The grinder comprises a high frequency induction type electric motor 30 having a stator 31 secured within a cylindrical casing 32 and a rotor 33 mounted in the usual manner within the stator 31. The rotor 33 is fixedly secured on a rotor shaft 34, the respective ends of the shaft 34 projecting beyond the rotor 33 and being journaled in ball bearing units 36 and 37. The rear ball bearing unit 36 is mounted in an integral cross plate 32a of the casing 32 and the forward bearing unit 37 is supported in a center plate 35 secured in the forward end of the casing. The motor 30 is electrically connected at its rearward end to current supply wires 38 of a cable 39 through a switch device 40 which includes a manually operable actuating member 41 slidably mounted in the handle portion 42 in the conventional manner. The cable 39 extends to the switch 40 through the open end of a cylindrical handle member 43 covered by a rubber sleeve 44. On the rotor shaft 34 between the bearing unit 37 and the motor 30 there is secured a fan 45 which serves to force cooling air, drawn in through casing openings 46, over the motor 30.

The forward end of the rotor shaft 34 is formed with gear teeth 47 which mesh with a pinion gear 48 and this pinion gear is fixed on the inner end of a flexible driving shaft or spindle 49, which comprises the present invention. The flexible driving spindle 49 comprises an inner or rearward section 50 and a forward section 51, which spindle sections are journaled in ball bearings 52 and 53, respectively, secured in the inner and outer ends of a spindle casing 54 extending forwardly from its mounting on the center plate 35 of the motor casing 32. The bearing 53 is retained within the open end of the spindle casing 54 by a clamp nut 56 and a lock nut 57, each threadedly secured on the outer end of the spindle casing.

A grinding wheel 58 is secured on the forward end of the spindle section 51 for rotation therewith by a nut 59 which serves to clamp the wheel against a driving collar 60 keyed to the spindle section 51. The rearward face of the driving collar 60 is provided with annular grooves 60a and ribs 60b which are adapted to receive and to be received within annular ribs 56a and grooves 56b, respectively, formed on the forward opposed face of the clamp nut 56, the clearance between the respective ribs and grooves being sufficient to permit free rotation of the driving collar 60 relative to the clamp nut 56. Rearwardly of the bearing 53, an oil wick unit 62 is mounted in the spindle casing 54 and affords proper lubrication of the forward end of a spindle retaining sleeve 72 and the forward bearing 53. A wheel guard 61 is mounted on the clamp nut 56 and extends over the upper portion of the grinding wheel 58.

As shown more specifically in Figs. 2 to 4, inclusive, of the drawings, the rear and frunt spindle sections 50 and 51 are similar to each other in construction, their opposite ends being completely cylindrical, and their adjacent portions 64 and 66, respectively, being substantially half cylindrical and overlapping each other in parallel relationship, thus complementing each other to form a substantially complete cylindrical section at the central portion of the spindle. The half cylindrical portions 64 and 66 are provided at their ends with radially directed transverse ribs or lugs 67 and 68, respectively, which project into transverse recesses 69 and 70, respectively, formed in the half cylindrical portions 66 and 64, respectively, adjacent the full cylindrical portions of the spindle sections 50 and 51. By the foregoing interengagement of the ribs 67 and 68 in the recesses 69 and 70, relative axial movement between the spindle sections 50 and 51 is prevented. There is, however, sufficient clearance between the top faces of the ribs 67 and 68 and the bottoms of the recesses 69 and 70 to permit the necessary relative rotation between the spindle sections.

The space formed between the two half cylindrical portions 64 and 66 and extending axially between the ribs 67 and 68 and diametrically from one side of the spindle to the other, is substantially filled by a pad 71 of rubber or other resilient material capable of absorbing or deadening operational shocks and rotational vibrations. The inner and outer spindle sections 50 and 51 with the rubber pad 71 therebetween are maintained in interengaged and assembled position by the outer sleeve 72 mounted within the spindle casing 54, which sleeve engages the outer peripheries of the spindle sections 50 and 51 and is adapted to rotate therewith but to permit limited rotary movement in either direction between the two spindle sections.

Thus, when the motor 30 is operated, the grinding wheel 58 is rotated through the rotation of the rotor shaft 34, the gear 47, the pinion 48 and the flexible multipart spindle 49, the driving torque of the inner spindle section 50 being transmitted to the outer or forward spindle section 51 through the rubber pad 71. With this construction, when the grinding wheel 58 is applied to the work to be ground, the consequent shocks and rotational vibrations that would normally be transmitted up into the tool so as to damage the gears, bearings and other parts, are considerably deadened and absorbed by the flexible rubber drive pad 71, and little or no shock and vibration passes on up into the tool through the inner spindle section 50. Because of the compressibility and resiliency of the pad 71, slight relative rotational movement of one of the spindle sections with respect to the other is permitted so that the vibratory rotation is absorbed by the rubber pad in a damping action. Consequently, the damage to the gears, bearings and other parts normally resulting from such shocks and vibration is eliminated, thereby reducing the overall maintenance and repair expense of the tool and extending its operable life.

Upon relative rotative movement between the spindle sections 50 and 51 and under all degrees of vibration and shock, the overall operable length of the flexible spindle 49, in contrast to certain prior art structures, remains the same, the flexibility of the spindle being accomplished solely by a non-lengthening relative rotational movement between the inner and outer spindle sections 50 and 51. No axial pressure or thrust on the various gears and bearings is built up and, consequently, injury to such parts which would normally result from such elongation, is also eliminated. While the ribs 67 and 68 and the recesses 69 and 70 of the spindle sections 50 and 51 serve as a positive means for preventing relative axial movement therebetween, the rubber pad 71, because of its high frictional engagement with the spindle sections, also serves to prevent such relative axial movement and under certain operating conditions the positive interengaging means could be eliminated with satisfactory results.

In Figs. 5 and 6 there is illustrated a second embodiment of a flexible driving spindle comprising the present invention, which is similar in construction to the first form above described. This embodiment comprises spindle sections 80 and 81 having complete cylindrical portions at their opposite ends and half cylindrical portions at their adjacent ends which overlap each other in parallel relationship. The spindle section 81 is provided with a radially directed transverse rib 82 which is received within a transverse recess 83 in the half cylindrical portion of the spindle section 80, there being sufficient clearance between the end face of the rib and the bottom of the recess to permit relative rotary movement therebetween. The spaces that are formed between the half cylindrical portions of the spindle sections 80 and 81 on each side of the rib 82 are filled by pads 84 and 85, respectively, of rubber or other resilient material similar to the pad 71 of the first embodiment. As in the first form, the spindle sections 80 and 81 are retained in assembled relation by a sleeve 86 which permits limited relative rotative movement between the sections.

The outer sides of the rib 82 adjacent the sleeve 86 are cut away as at 82a and 82b, as shown in Fig. 6, to provide clearance for relative rotational movement between the spindle sections during operation of the tool. The engagefent of the rib 82 in the recess 83 serves to prevent relative axial movement between the spindle sections 80 and 81 while the rubber pad 84, as in the first form, serves to transmit the driving torque from the spindle section 80 to the spindle section 81 and further serves to deaden and absorb the rotational vibrations occurring when the grinding wheel 58 is applied to the work.

A third embodiment of the invention is shown in Figs. 7 and 8. In this form the spindle sections 90 and 91 are also formed with half cylindrical portions which overlap each other in parallel relationship, and these half cylindrical portions are provided with aligned hemispherical recesses 92 and 93, respectively, formed therein at the central portion thereof. These hemispherical recesses 92 and 93 form a socket and are adapted to receive a retaining ball 94 which serves to prevent relative axial movement between the spindle sections 90 and 91, similar to the ribs of the above described forms. The space formed between the half cylindrical portions of the spindle sections 90 and 91 is substantially filled by a pad 95 of rubber or other resilient material, there being a circular opening through the center of this pad through which the retaining ball 94 may extend from one recess 92 to the other recess 93. The above described parts are maintained in operable relation by a sleeve 96 which is adapted to rotate with the spindle sections 90 and 91 but to permit limited relative rotation between those sections. The operation of this third form is substantially the same as that of the first two forms, the construction providing for slight relative rotation between the spindle sections 90 and 91 and relative axial movement therebetween being prevented.

The fourth form of the invention shown in Figs. 9 and 10 is also quite similar to that of Figs. 7 and 8. The half cylindrical portions of the spindle sections 100 and 101 are each provided with axially extending and transversely-curved recesses 102 and 103, respectively. These recesses 102 and 103 are in alignment and provide a cylindrical socket in which is received a cylindrical retaining roller 104 which serves to prevent relative axial movement between the spindle sections 100 and 101. A pad 105 of rubber or other resilient material is positioned in the space formed between the half cylindrical portions of the spindle sections 100 and 101 and is provided with a central opening through which the cylindrical retaining roller 104 may extend from one recess 102 to the other recess 103. These parts are likewise retained in assembled condition by a sleeve 106 which rotates with the spindle sections 100 and 101 but permits slight relative rotation therebetween.

The fifth embodiment of the present invention illustrated in Figs. 11 and 12 of the drawings is quite similar to the form illustrated in Figs. 7 and 8 but is particularly adaptable to tools having spindles of smaller diameter. In this form the half cylindrical portions of the spindle sections 110 and 111 are provided with aligned hemispherical recesses 112 and 113 and 114 and 115, respectively, into which are received retaining balls 116 and 117 which serve to prevent relative axial movement between the spindle sections 110 and 111. The plurality of balls and recesses afford a strong retaining means for a spindle of a reduced diameter. A rubber pad 118 is positioned in the space formed between the half cylindrical portions of the spindle sections 110 and 111 and extends axially between the balls 116 and 117 and transversely of the spindle sections from side to side. The spindle sections 110 and 111 and parts are maintained in assembled relation by a sleeve 118 which permits limited relative rotation between the spindle sections.

A sixth form of the invention is illustrated in Figs. 13 and 14 which is similar in operation to the forms above described. This embodiment comprises spindle sections 120 and 121 having half cylindrical portions provided with aligned and radially extending circular recesses 122 and 123 in which are received a transverse cylindrical retaining pin 124 which serves to prevent relative axial movement between the spindle sections 120 and 121. A rubber pad 125 is positioned in the clearance space between the half cylindrical portions of the spindle sections 120 and 121 and has a central opening through which the retaining pin 124 may project from the recess 122 into the recess 123. As shown in Fig. 14, the outer sides of the retaining pin 124 are cut away as at 124a so as to permit limited relative rotational movement between the spindle sections 120 and 121.

The next embodiment illustrated in Figs. 15 and 16 is an adaptation of the form shown in Figs. 13 and 14 to a spindle having a relatively smaller diameter. In this embodiment the half cylindrical portions of the spindle sections 130 and 131 are provided with aligned and radially extending circular recesses 132 and 133 and 134 and 135, respectively, in which are received retaining pins 136 and 137, respectively. The retaining pins 136 and 137 serve to prevent relative axial movement between the spindle sections 130 and 131 and they are cut away on their outer sides 136a and 137a to permit slight relative rotational movement between the spindle sections. A rubber pad 138 is positioned in the space between the half cylindrical portions and extends longitudinally between the pins 136 and 137 and from side to side of the spindle sections 130 and 131. The parts of this embodiment are likewise maintained in assembled condition by a sleeve 139 which permits slight relative rotational movement between the spindle sections 130 and 131 during tool operation.

The eighth embodiment of the invention which is shown in Figs. 17 and 18 of the drawings is similar to that of Figs. 13 and 14, except that the retaining pin 140 projects entirely through aligned and diametrically extending circular openings 141 and 142 in the half cylindrical portions of spindle sections 143 and 144, respectively. The retaining pin 140 is cut away at its sides, as at 140a, to permit relative rotational movement between the spindle sections 143 and 144 and at the same time serves to prevent relative axial movement between those spindle sections. A rubber pad 145 is confined within the space between the half cylindrical portions of the spindle sections 143 and 144 and is provided with a circular central opening through which the pin 140 may extend. The pin 140 is held within the openings 141 and 142 and the spindle sections are retained in assembled condition by a sleeve 146. Although the pin 140 extends entirely through the spindle sections, the operation of this embodiment is the same as those previously described.

The last two embodiments of the invention shown in Figs. 19 and 20 and in Figs. 21 and 22, respectively, are somewhat different from the embodiments above described in that relative axial movement of the spindle sections is restrained by engagement of the retaining means with the sleeve rather than between the sections themselves. In the embodiments shown in Figs. 19 and 20 the spindle sections 150 and 151 are provided with diametrically extending holes 152 and 153 formed in the respective full cylindrical ends of the spindle sections. The holes 152 and 153 are adapted to receive rivet pins 154 and 155, respectively, which extend therethrough and through aligned openings 156, 156 and 157, 157, respectively, in a retaining sleeve 158. The rivets 154 and 155 are provided with enlarged heads which serve to retain the pins in operable position. As shown in Fig. 20 the holes 152 and 153 are somewhat larger than the diameter of the rivets 154 and 155 so as to permit relative rotative movement between the spindle sections 150 and 151. As in the other embodiments, a rubber pad 159 is positioned in the space between the half cylindrical portions of the spindle sections 150 and 151 and serves to absorb the rotational vibrations occurring during engagement of the grinding wheel with the work.

The last embodiment shown in Figs. 21 and 22 comprises spindle sections 160 and 161 having half cylindrical portions between which a rubber pad 162 is confined. Spindle sections 160 and 161 are each provided with annular grooves 163 and 164 in the outer peripheries of the spindle sections 160 and 161, respectively. These annular grooves 163 and 164 are in alignment with annular grooves 165 and 166 formed in the inner periphery of a retaining sleeve 167. The aligned grooves 163 and 165 and 164 and 166 thus provide annular channels in which are inserted wire rings 168 and 169, respectively, these wire rings serving to prevent relative axial movement of the spindle sections 160 and 161 relative to each other and relative to the sleeve 167. As shown in Fig. 22, access to the annular grooves for insertion of the wire rings 168 and 169 is provided by openings 170 in the sleeve 167.

Although there have been shown in the drawings and described above a number of embodiments of the present invention, it is apparent that modifications may be made in the structural details thereof without departing from the spirit and scope of the appended claims.

We claim:

1. In a rotary, motor-driven tool having a tool member for engagement with the work, a flexible, multipart, rotary spindle comprising a spindle section adapted to be drivingly connected with the tool member, a spindle section adapted to be operably connected with the the motor, each of said spindle sections having an axially extending portion and said axially extending portions being disposed in overlapping but spaced relationship, a rubber pad positioned in the space between said overlapping spindle portions and adapted to transmit driving torque from one spindle section to the other and to permit limited relative rotation therebetween, and means for preventing axial movement of said spindle sections relative to each other comprising a recess in one of said overlapping spindle portions and a projecting member on the other overlapping spindle portion extending into said recess.

2. In a portable rotary, motor driven tool having a tool member for engagement with the work, a flexible, multipart, rotary spindle comprising a spindle section adapted to be drivingly connected with the tool member, a spindle section adapted to be operably connected with the motor, each of said spindle sections having an axially extending half-cylindrical portion and said half-cylindrical portions being disposed in overlapping but spaced relationship with their flat faces opposed to each other, a resilient torque transmitting means comprising a rubber pad positioned between and in engagement with the opposed faces of said half-cylindrical portions and adapted to permit limited rotation of one spindle section relative to the other, and positive locking means for preventing axial movement of said spindle sections relative to each other upon relative rotation therebetween comprising a radially directed recess in the flat face of one of said overlapping spindle portions extending transversely relative to the axis of said spindle and a transversely extending member projecting from the face of the other overlapping spindle portion and extending into said recess.

3. In a portable rotary, motor driven tool having a tool member for engagement with the work, a flexible, multipart, rotary spindle comprising a spindle section adapted to be drivingly connected with the tool member, a spindle section adapted to be operably connected with the motor, each of said spindle sections having an axially extending and substantially half-cylindrical portion and said half-cylindrical portions being disposed in overlapping but spaced relationship with their flat faces opposed to each other, a pad of compressible resilient material disposed between and in engagement with the opposed faces of said half-cylindrical portions, said pad being adapted to transmit driving torque from one spindle section to the other while permitting limited relative rotation therebetween and said pad also being adapted to absorb operational vibrations of the tool member, sleeve means disposed concentrically around said half-cylindrical portions for retaining the same in assembled overlapping relation, at least one of said half-cylindrical portions having a recess therein, and a rigid non-resilient locking element extending transversely of said half-cylindrical portions and coacting with said recess and the other of said half-cylindrical portions for preventing relative axial movement between said spindle sections when said half-cylindrical portions are in said assembled overlapping relation.

4. The device of claim 3 further characterized in that said half-cylindrical portions are provided with opposed aligned recesses and said locking element is interengaged in said recesses.

5. The device of claim 3 further characterized in that said half-cylindrical portions are provided with a pair of aligned recesses in the opposed flat faces thereof, said locking element is interengaged in said recesses, and said locking element is shaped relative to said recesses to permit limited relative rotative movement between the spindle sections.

6. The device of claim 3 further characterized in that said half-cylindrical portions are provided with opposed aligned rounded recesses forming a rounded socket therebetween and said locking element comprises a rounded member positioned in said socket.

7. The device of claim 3 further characterized in that said half-cylindrical portions are provided with opposed aligned rounded recesses forming a rounded socket therebetween, said pad is provided with an aperture in alignment with said recesses, and said locking element comprises a rounded member positioned in said socket and extending through said aperture.

8. The device of claim 3 further characterized in that said half-cylindrical portions are provided with aligned substantially hemispherical recesses defining a socket therebetween and said locking element comprises a retaining ball disposed in said socket.

9. The device of claim 3 further characterized in that said half-cylindrical portions are provided with aligned substantially hemispherical recesses defining a socket therebetween, said pad is provided with an aperture in alignment with said recesses, and said locking element comprises a retaining ball disposed in said socket and extending through said aperture.

10. The device of claim 3 further characterized in that said pad comprises a rubber pad.

GILBERT B. LARSON.
JAMES A. PERHAM.

REFERENCES CITED

The following references are of record in the file of this patent:

UNITED STATES PATENTS

| Number | Name | Date |
|---|---|---|
| 210,268 | Replogle | Nov. 26, 1878 |
| 1,039,342 | Wheelock | Sept. 24, 1912 |
| 1,548,629 | Pfander | Aug. 4, 1925 |
| 2,100,232 | Barry | Nov. 23, 1937 |
| 2,112,695 | Forss | Mar. 29, 1938 |
| 2,259,797 | Cohen | Oct. 21, 1941 |

FOREIGN PATENTS

| Number | Country | Date |
|---|---|---|
| 798,315 | France | 1936 |